(12) United States Patent  
Itskov et al.

(10) Patent No.: US 7,946,920 B2  
(45) Date of Patent: May 24, 2011

(54) COUNTERTOP VIDEO GAME TERMINAL

(75) Inventors: Boris Itskov, Thornhill (CA); Igor Starovoitov, Toronto (CA); Genadi Peari, Richmond Hill (CA)

(73) Assignee: JVL Corporation, Concord, Ontario (CA)

( * ) Notice: Subject to any disclaimer, the term of this patent is extended or adjusted under 35 U.S.C. 154(b) by 1288 days.

(21) Appl. No.: 11/519,900

(22) Filed: Sep. 13, 2006

(65) Prior Publication Data

US 2008/0096653 A1 Apr. 24, 2008

(51) Int. Cl.  
*G06F 17/00* (2006.01)
(52) U.S. Cl. .......................................................... 463/36
(58) Field of Classification Search .............. 463/36–38; 345/161  
See application file for complete search history.

(56) References Cited

U.S. PATENT DOCUMENTS

| | | | | |
|---|---|---|---|---|
| 6,102,476 | A * | 8/2000 | May et al. ................ | 297/217.3 |
| 6,269,753 | B1 * | 8/2001 | Roddan .................... | 108/50.01 |
| 6,374,752 | B1 * | 4/2002 | Walser ..................... | 108/50.01 |
| 6,394,402 | B2 * | 5/2002 | Coonan et al. ........... | 248/123.11 |
| 7,690,317 | B2 * | 4/2010 | Beck et al. ................ | 108/143 |
| 2004/0254020 | A1 * | 12/2004 | Dragusin .................. | 463/46 |
| 2008/0100106 | A1 * | 5/2008 | Dragusin .................. | 297/217.3 |

* cited by examiner

*Primary Examiner* — Ronald Laneau

(57) ABSTRACT

The video game terminal uses a center pedestal and two column members either side of the center pedestal for supporting a touch screen. The center pedestal holds the working components of the terminal including the CPU and payment acceptors. The center pedestal supports the touch screen at a raised position and the columns provide edge support of the touch screen. Preferably, an ambient light arrangement is provided either side of the terminal.

20 Claims, 25 Drawing Sheets

Exploded View

COUNTERTOP VIDEO GAME TERMINAL

FIELD OF THE INVENTION

The present invention relates to a countertop video game terminal of a robust construction that uses a large touch screen while maintaining a sleek appearance.

BACKGROUND OF THE INVENTION

Countertop video terminals are well known and commonly provided in restaurants, taverns, and other entertainment facilities. These terminals are typically standalone devices and include a payment facility including coin or banknote payment systems and/or credit cards. Often, the game terminals have relatively simple, straightforward games which take approximately two to four minutes to complete. These terminals are typically unattended requiring a rugged design as they are subject to a significant abuse.

Many of these game terminals include touch screens for allowing the player to input information and input various game instructions. Some game terminals having touch screens also include a joy stick controller in combination with separate button actuators.

Although countertop video game terminals are subject to substantial abuse and therefore designed to be of a robust rugged construction, these terminals must also have an esthetically pleasing outer configuration to attract and encourage game play.

The development of more sophisticated games and in particular, the graphic illustrations included in the games, has promoted the change from 15 inch touch screens to 17 inch touch screens, or larger. The additional size of the screen also renders the terminal more vulnerable to damage.

The present invention seeks to provide a countertop video game terminal which is esthetically pleasing while being of a rugged design.

SUMMARY OF THE INVENTION

A countertop video game terminal according to the present invention comprises
 a base,
 a touch screen assembly mounted above the base,
 a center pedestal of a width less than the width of said touch screen such that said touch screen extends in front of and either side of said center pedestal, two column supports extending from said base and positioned to opposite sides of said center pedestal and to opposite sides of said screen assembly, and wherein said column supports provide edge support for said screen assembly.

According to an aspect of the invention the center pedestal includes generally parallel side members.

In a different aspect of the invention, the column supports are spaced from the center pedestal with a gap located between said center pedestal and each column support.

In an aspect of the invention, each column support includes a speaker provided adjacent a base of the column support.

In a preferred aspect of the invention, each speaker faces downwardly and an opening is provides in said base for transmitting sound emitted by said speakers to a front side of said countertop video game terminal.

In a preferred aspect of the invention, said center pedestal includes a removable lockable cover. Preferably, the center pedestal includes interior thereto a coin acceptor, a banknote acceptor, a removable coin box and a removable banknote cassette with the coin acceptor and banknote acceptor accessible at the exterior of the pedestal.

In a preferred aspect of the invention, the touch screen assembly includes an outer frame of a light transmitting translucent plastic material.

In an aspect of the invention, each column support includes a light source aligned with an edge of the translucent plastic material and cooperates to provide a light transmission path in the length of a member forming a side of the outer frame. Preferably the light transmitting translucent plastic material includes a polished edge portion opposite each light source for receiving emitted light transmitted through said translucent plastic material.

In a further aspect of the invention, each light source is an LED light source. Preferably, the LED light source is capable of emitting light of at least two different colors.

In one aspect of the invention, the countertop video game terminal includes programming for inputting operator instructions using said touch screen for determining the color of light emitted by the LED light sources. Preferably, each LED light source is positioned below the translucent plastic frame and light is transmitted along side edges of said translucent plastic frame.

In yet a further aspect of the invention, the translucent plastic frame has a composition and/or surface treatment to reflect a portion of the light passing through the translucent plastic frame out through a front face of the frame.

In a different aspect of the invention, the base below and in front of the touch screen assembly includes a joy stick controller. The joy stick controller includes a player controlled cover member movably supported in said base around said joy stick controller. The player controlled cover member moves the joy stick controller for inputting game signals while limiting abusive downward and lateral forces that can be exerted on said joy stick controller. The abusive downward and lateral forces are transmitted to the cover member and said base while maintaining the functionality of said joy stick controller for game input signals.

In a further aspect of the invention, the cover member includes a pivoting connection between a control shaft of said joy stick controller and said cover member such that only lateral movement of said cover member is transmitted to said shaft that causes lateral and pivoting movement thereof.

In a preferred aspect of the invention, the removable cover of said center pedestal includes a releasable lock arrangement including two insert hooks on said cover received in slots of said pedestal for securing one edge of said cover and a 3 point key actuated mechanism for engaging an opposite edge of said removable cover to said center pedestal.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
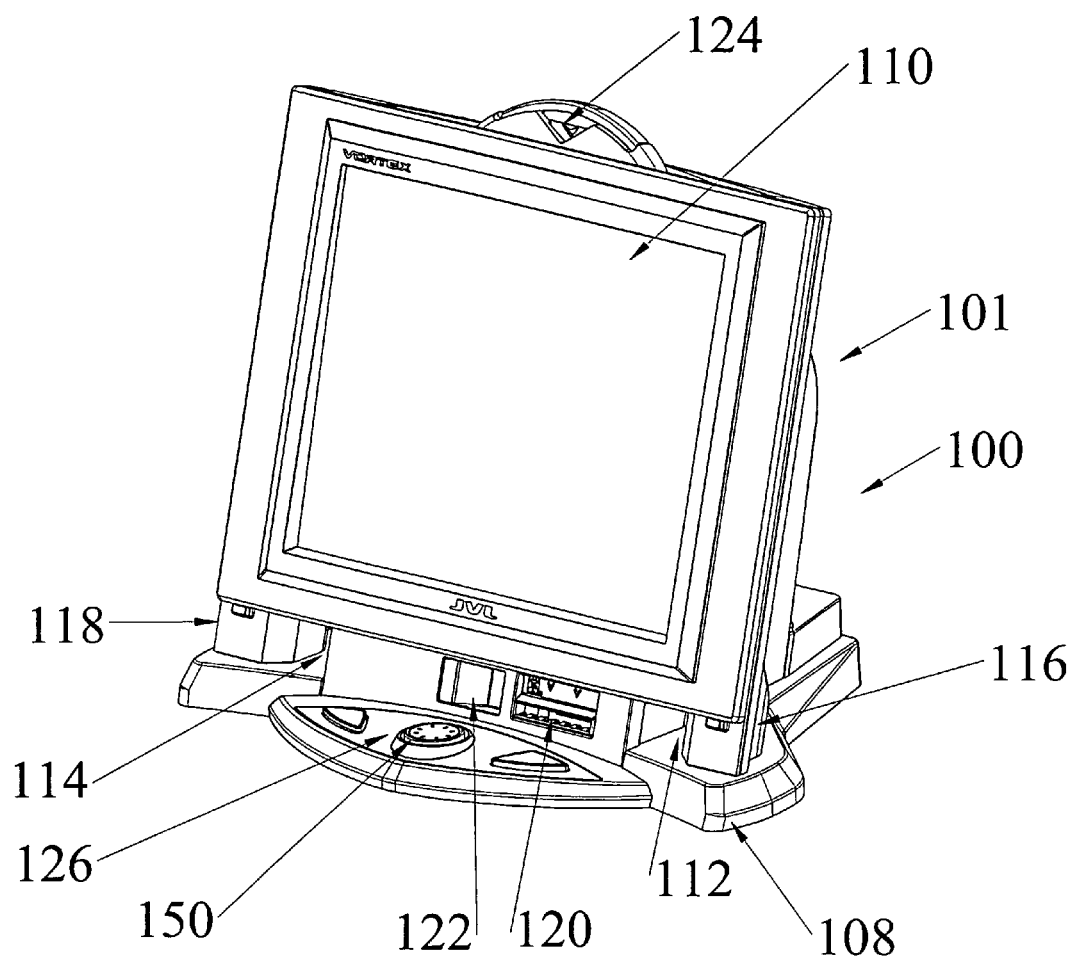
FIG. 1 is a front perspective view of the countertop video game terminal.

The countertop video game terminal 100 shown in the Figures includes a series of structural components which form a framework for supporting the individual elements of the terminal. In particular, the framework includes a center pedestal 102 in combination with two column supports 104 and 106 which extend upwardly from the base portion 108. A touch screen assembly 110 is secured to the center pedestal above the base portion and is supported either side of the center pedestal by the two column supports. A gap 112 and 114 are provided between the center pedestal and the two column supports. These column supports provide edge support for the screen assembly.

The touch screen assembly 110 is mounted on the center pedestal and the two column supports at a position above the bottom plate. A gap is provided below the touch screen that preferably accommodates the payment devices. Banknotes are fed to a banknote acceptor inlet 120 into a validator contained in the center pedestal and a coin slot return is provided at 122. A coin input slot 124 is provided at an upper position above the touch screen assembly. The center pedestal houses the major components of the countertop video in a central region which does not extend the full width of the touch screen. The edges of the touch screen are supported to either side of the center pedestal by the column supports. With this arrangement, the outer configuration of the terminal appears to be more compacted and streamlined, while still using a large touch screen, in this case, a 17 inch touch screen although larger screens can be used.

Below the touch screen assembly is an extension 126 of the base that includes a low profile joystick control 112 in combination with left and right button actuators either side of the joystick control 150.

Figure 2:
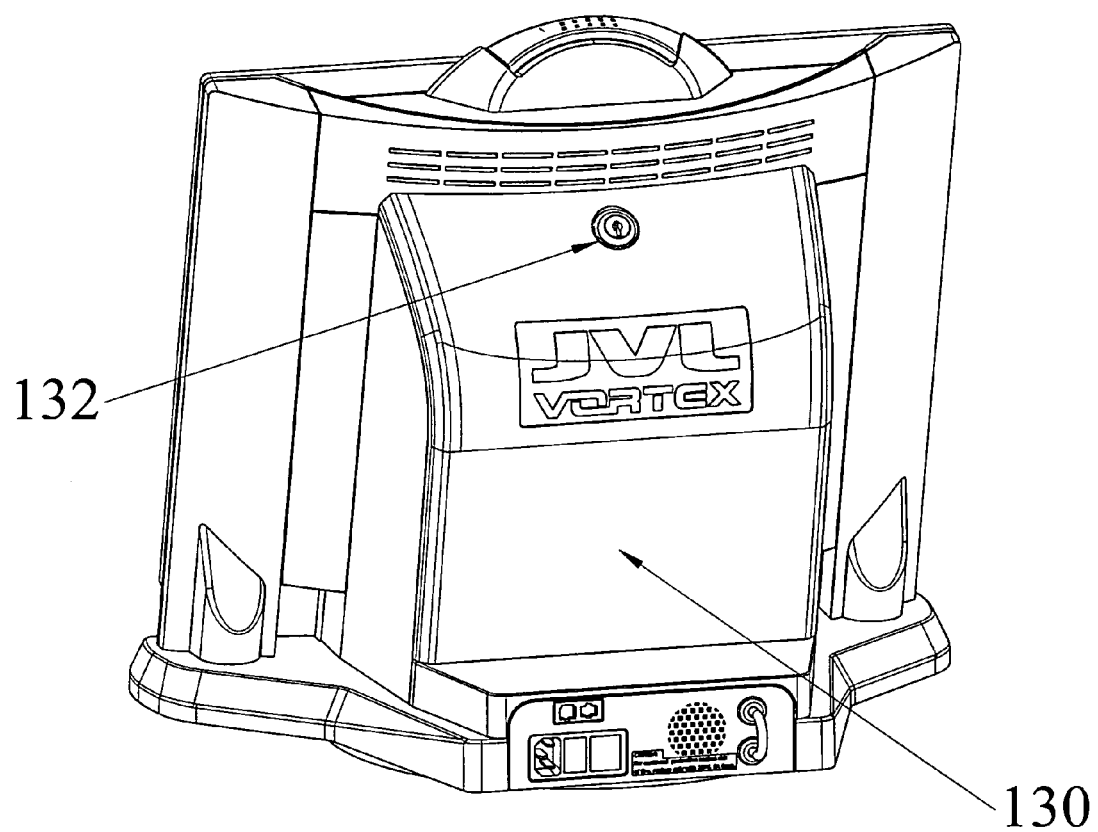
FIG. 2 is a rear perspective view of the video game terminal.
Figure 3:
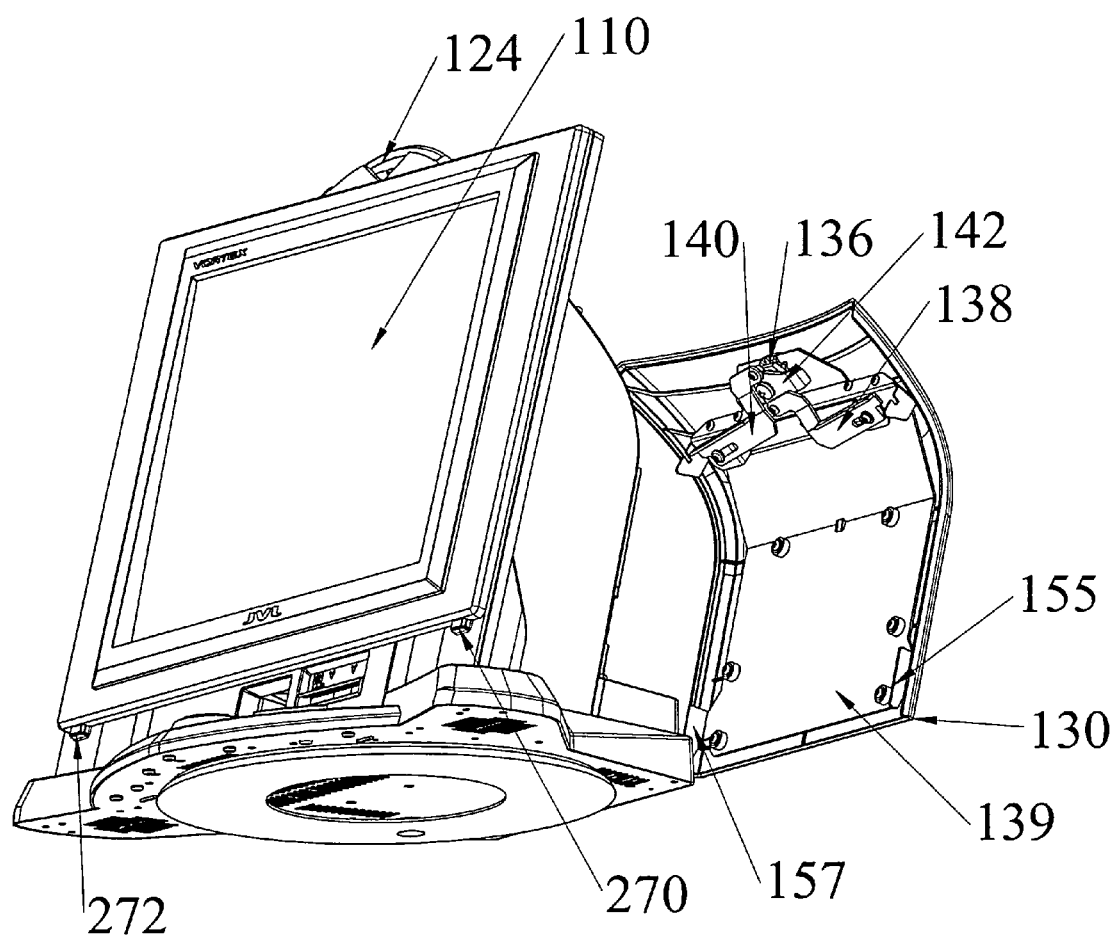
FIG. 3 is a partial perspective view showing the video game terminal with a rear cover partially removed.
Figure 4:
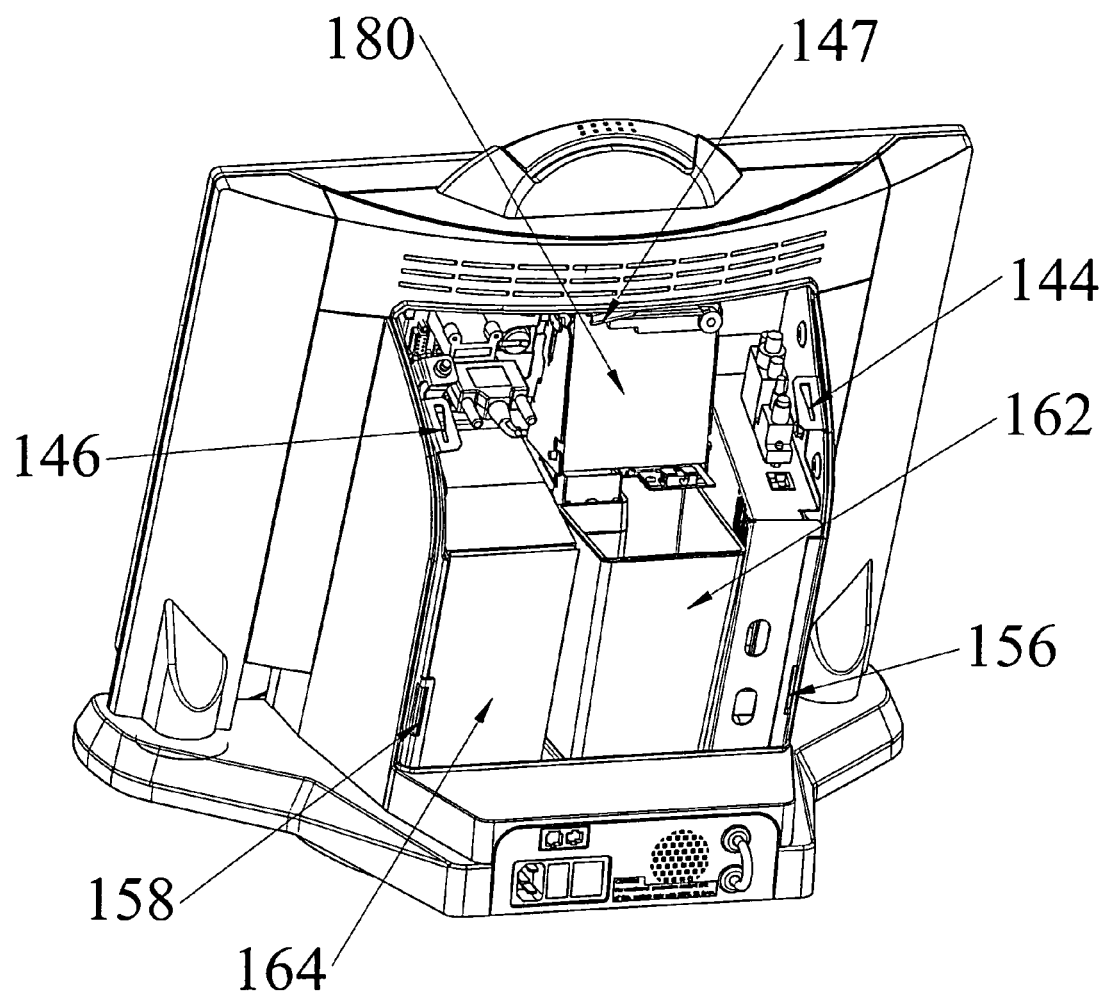
FIG. 4 is a rear perspective view of the video game terminal with the rear cover removed.
Figure 5:
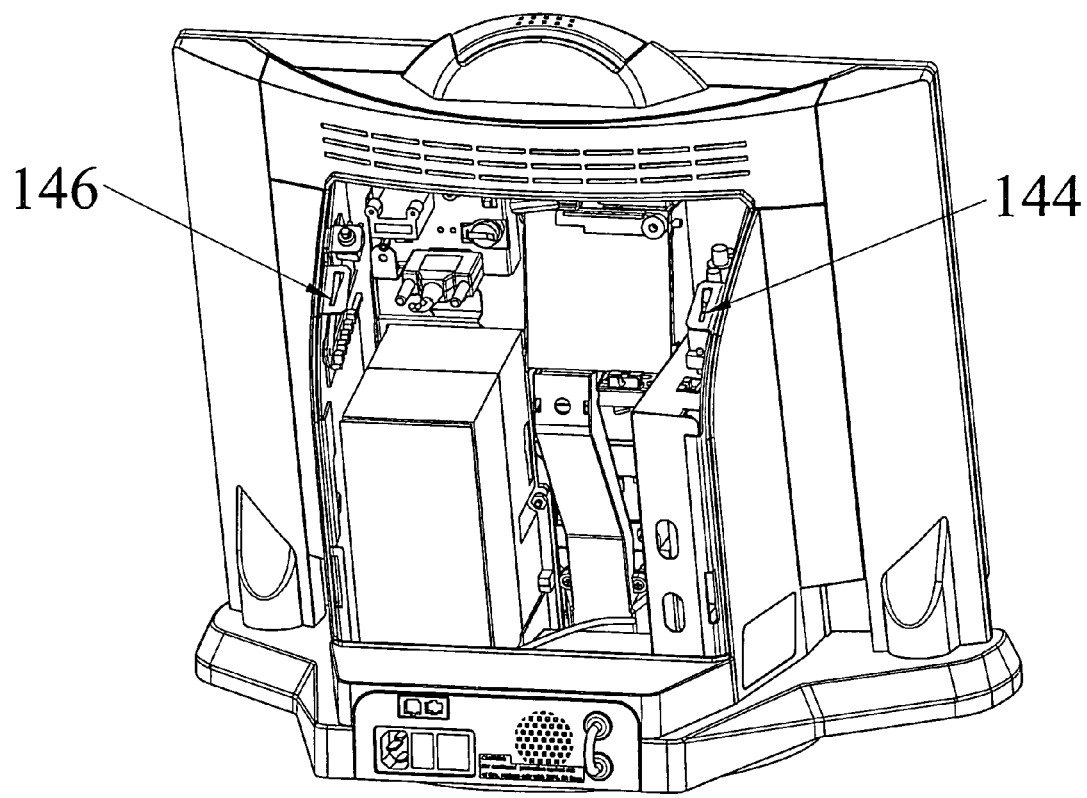
FIG. 5 is a rear perspective view of the video game terminal with the coin box removed.

The rear of the center pedestal, as shown in FIG. 2, is covered by the removable cover 130 which includes a key lock 132. This cover is preferably molded plastic and is reinforced with a metal inner plate 139 as shown in FIG. 3. The removable cover includes an upper three way lock shown as 136. This includes two pivoting arms 138 and 140 in combination with a central latch 142. The pivoting arms engage two locking flanges shown as 144 and 146 in FIG. 5. The latch 142 engages flange 147. With this arrangement, three locking points are provided at the upper part of the cover, when appropriately positioned by means of the key actuator. The lower part of the cover includes two hook members 155 and 157 which are received in the locking flanges 156 and 158 provided near the rear base of the pedestal. The hook members are inserted in these slots and firmly releasably fix the cover to the pedestal until the upper portion of the cover is released by the lock. Interior to the pedestal is a coin drop box 162 and a banknote storage cassette 164. Each of the drop box and the cassette is removable from the center pedestal by release of the cover. These provide a simple secure arrangement for storing the funds until an owner or operator services the terminal.

Figure 6:
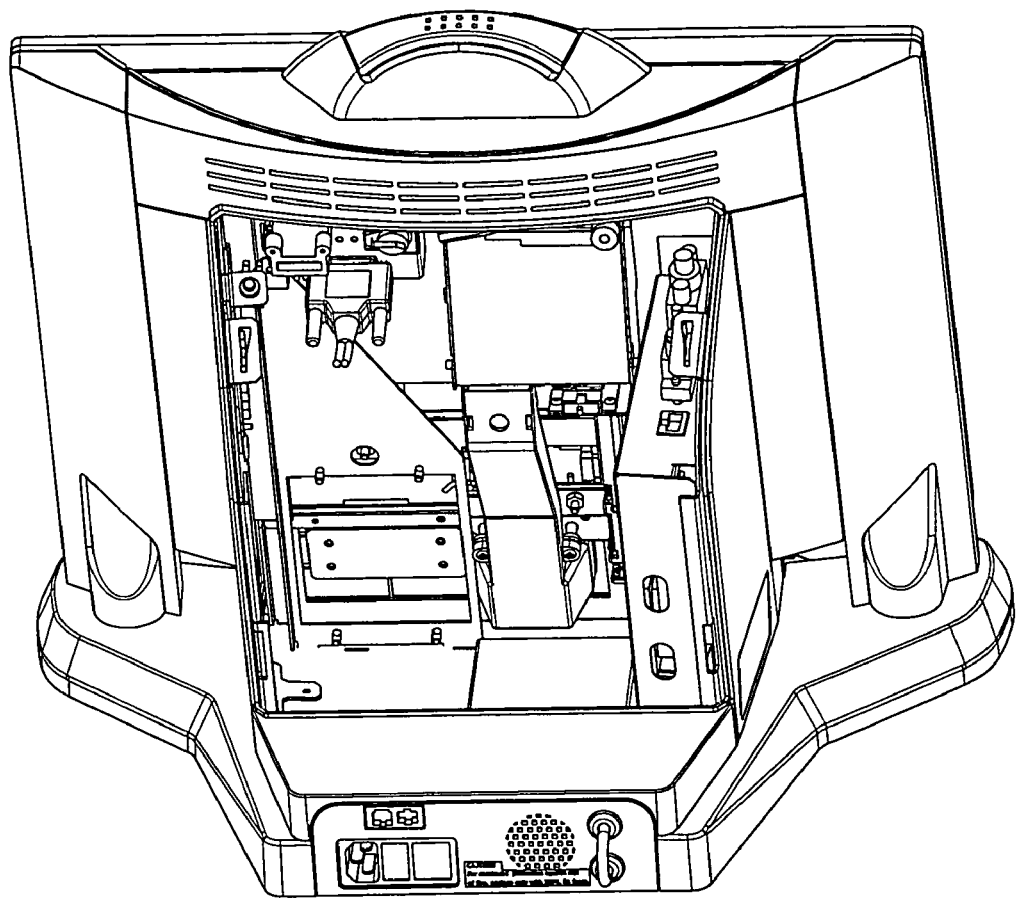
FIG. 6 is a rear perspective view of the video game terminal with both the coin box and the banknote cassette box removed.

The perspective view of FIG. 6 shows additional details of the internal components of the countertop video terminal with the banknote cassette and the coin drop box removed.

Figure 7:
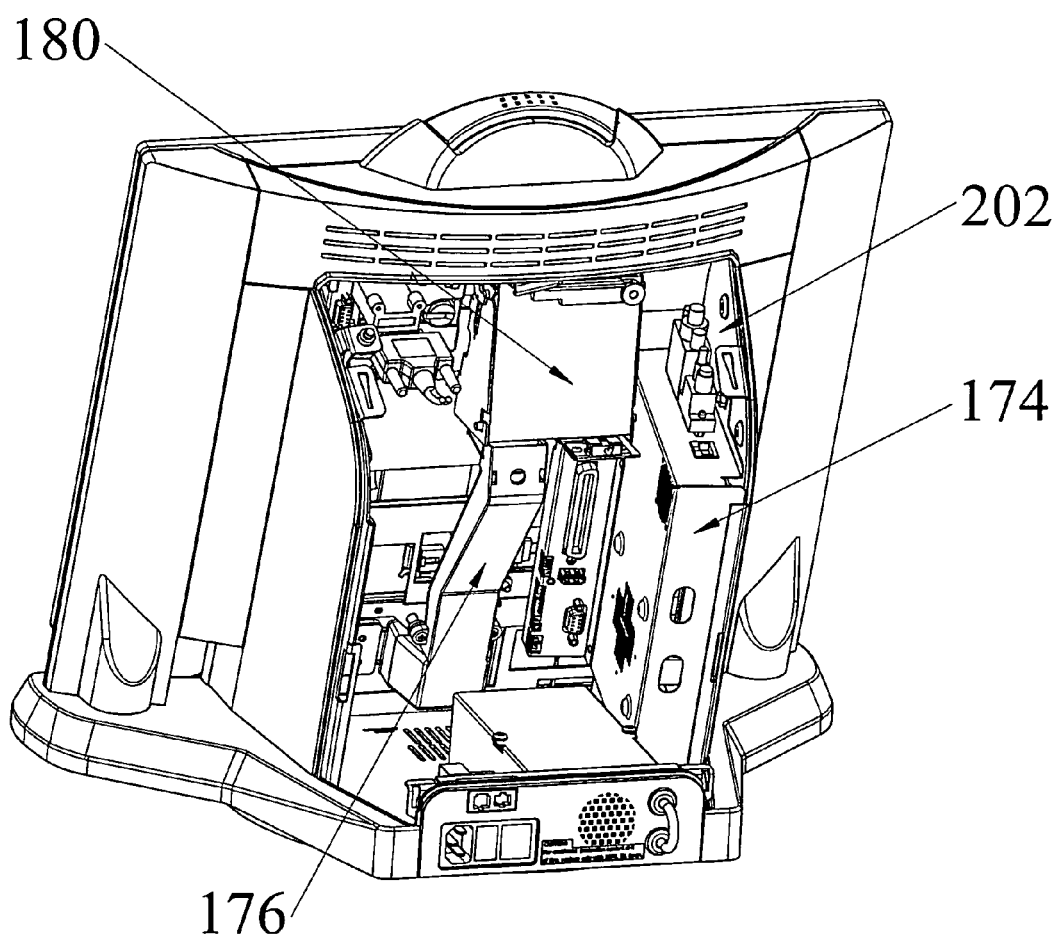
FIG. 7 is a rear perspective view of the countertop video game.
Figure 8:
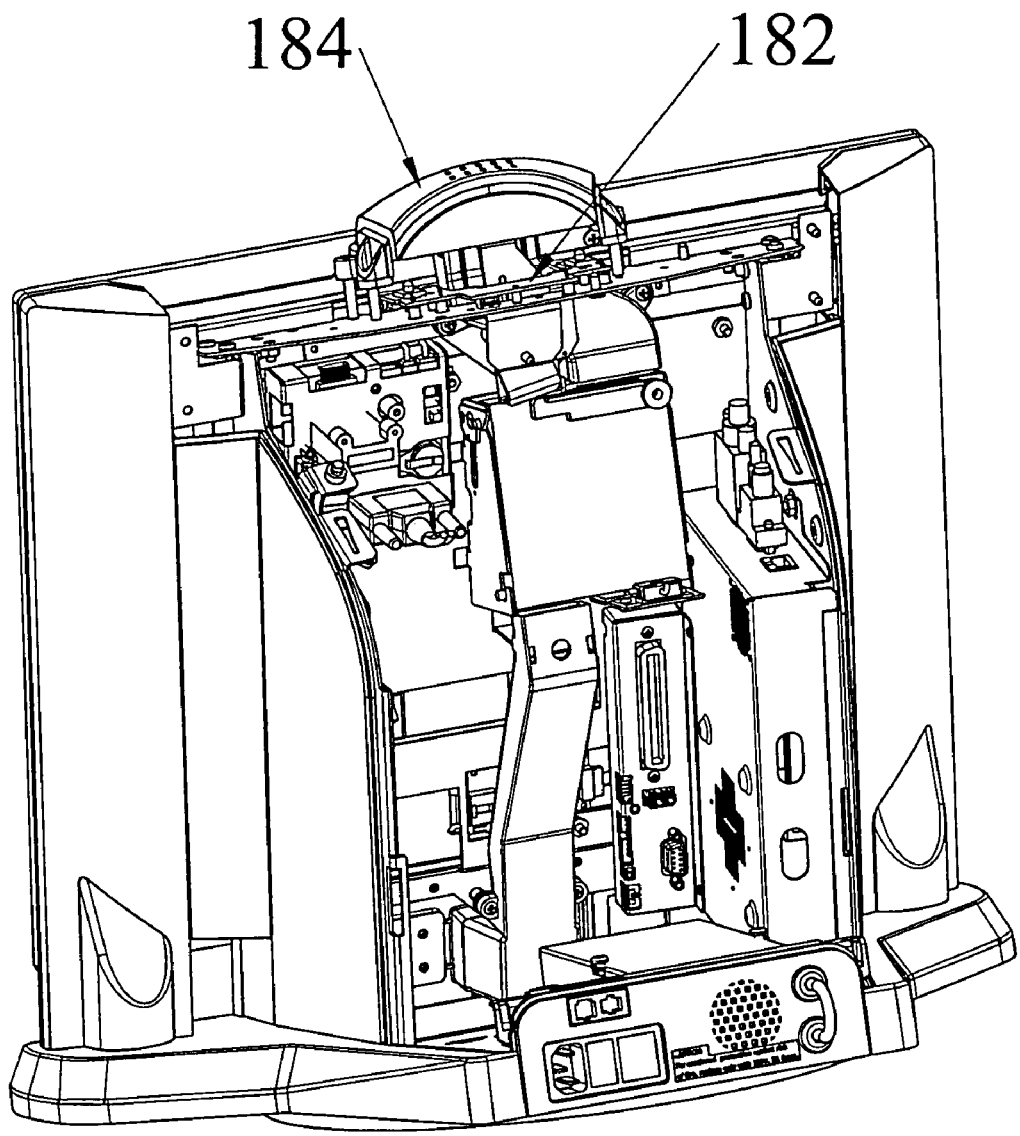
FIG. 8 is a side perspective view of the countertop video game.
Figure 9:
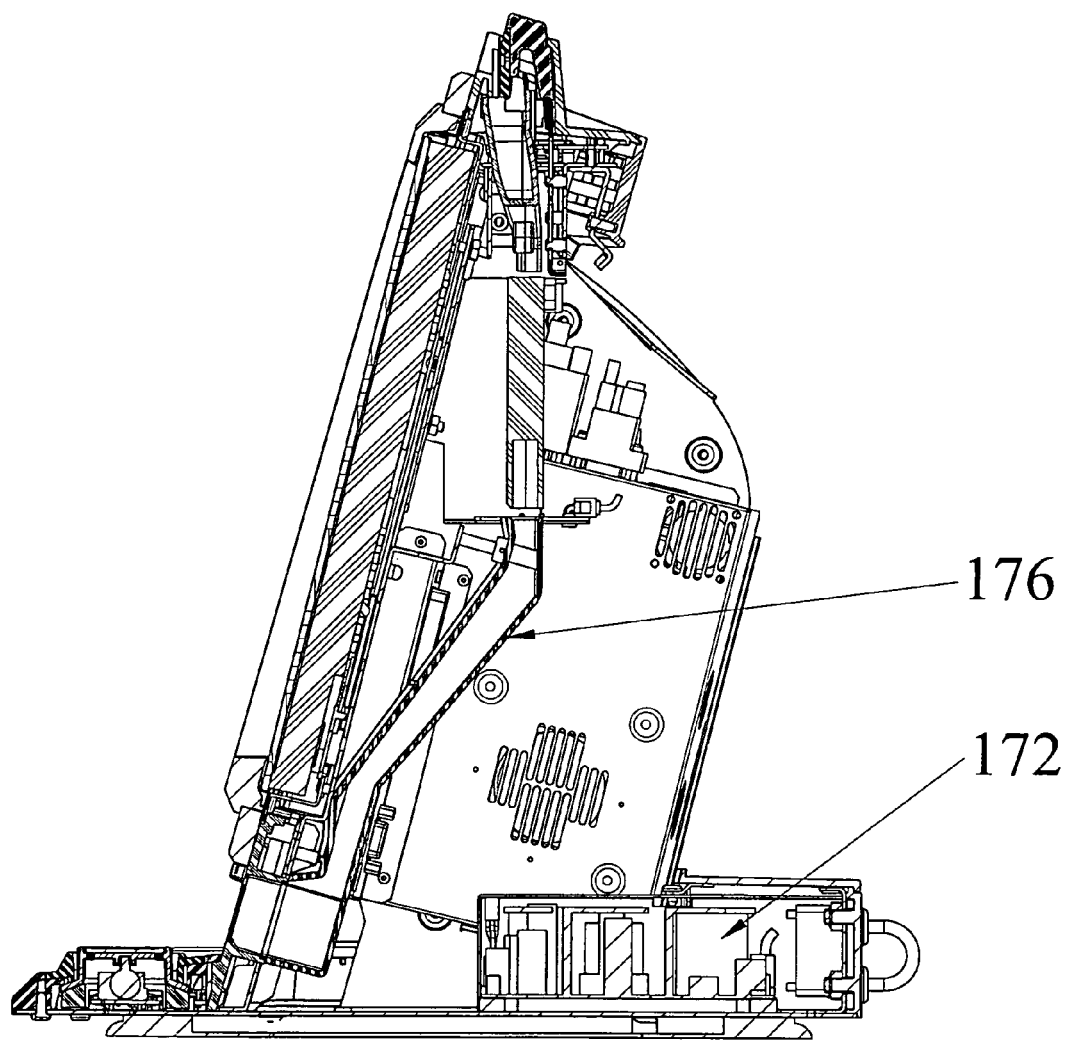
FIG. 9 is a sectional view through the countertop video game terminal.
Figure 10:
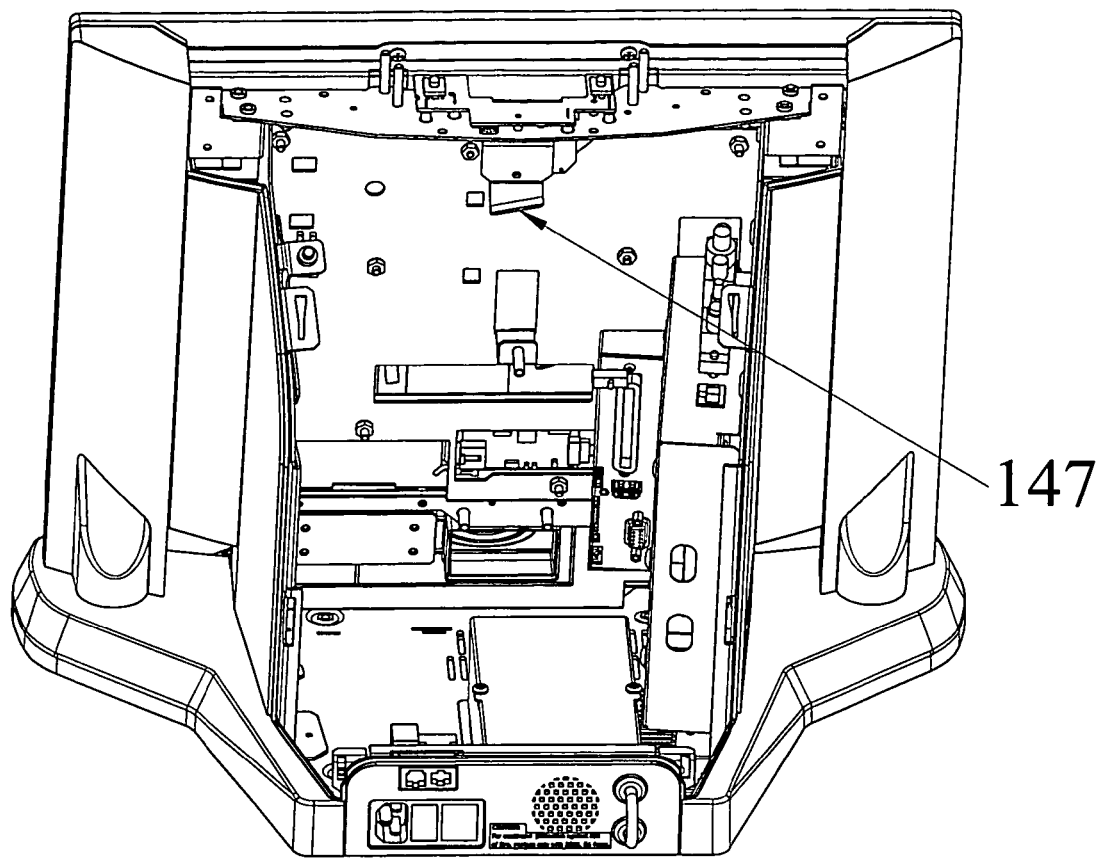
FIG. 10 is a rear perspective of the countertop video game terminal with a portion of the terminal removed.

FIG. 7 shows the power supply member 172, a CPU shield member 174, and the coin return shoot 176. Interior to the central pedestal is the coin acceptor 180.

An upper light board 182 is provided near the top of the terminal and produces light for projecting through translucent members 184 to provide further attraction to the terminal.

The perspective view of FIGS. 20 through 25 show details of the framework of the countertop video.

Figure 25:
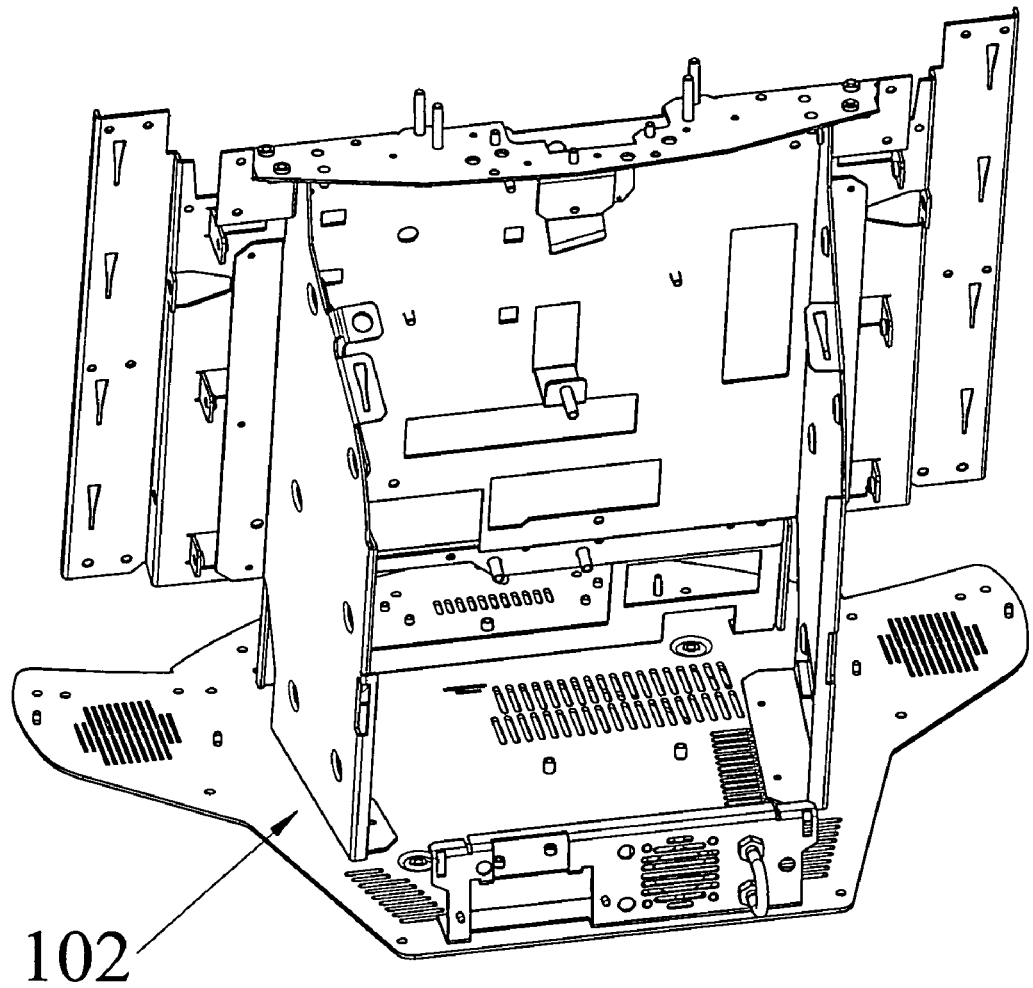
FIG. 25 is a rear perspective view of the framework of the partially assembled video game terminal.

In FIG. 25, the skeleton of the framework is shown. A base plate 102 serves to support the left and right side members 200 and 202 of the center pedestal. Various ported grills are provided in the base 102 and various brackets attached thereto to allow cooling air to flow therethrough. The base member does include speaker mounting portions 206 and 208 that will further be described.

The side members 200 of the center pedestal 102 include a connecting panel 210 for receiving and supporting the screen assembly. Projecting either side of the pedestal is the screen chassis 143 which partially defines the two column supports 104 and 106 either side of the pedestal. These column supports are further defined by the bracket extension members 220 and 222 provided above the base member 102. The screen chassis 143 fully supports the oversized screen assembly using the two column members and the central pedestal. This provides a robust structure and also provides a sizeable center pedestal for housing the various components of the game terminal. The center pedestal also provides room for the removable coin box and banknote cassette.

Figure 11A:
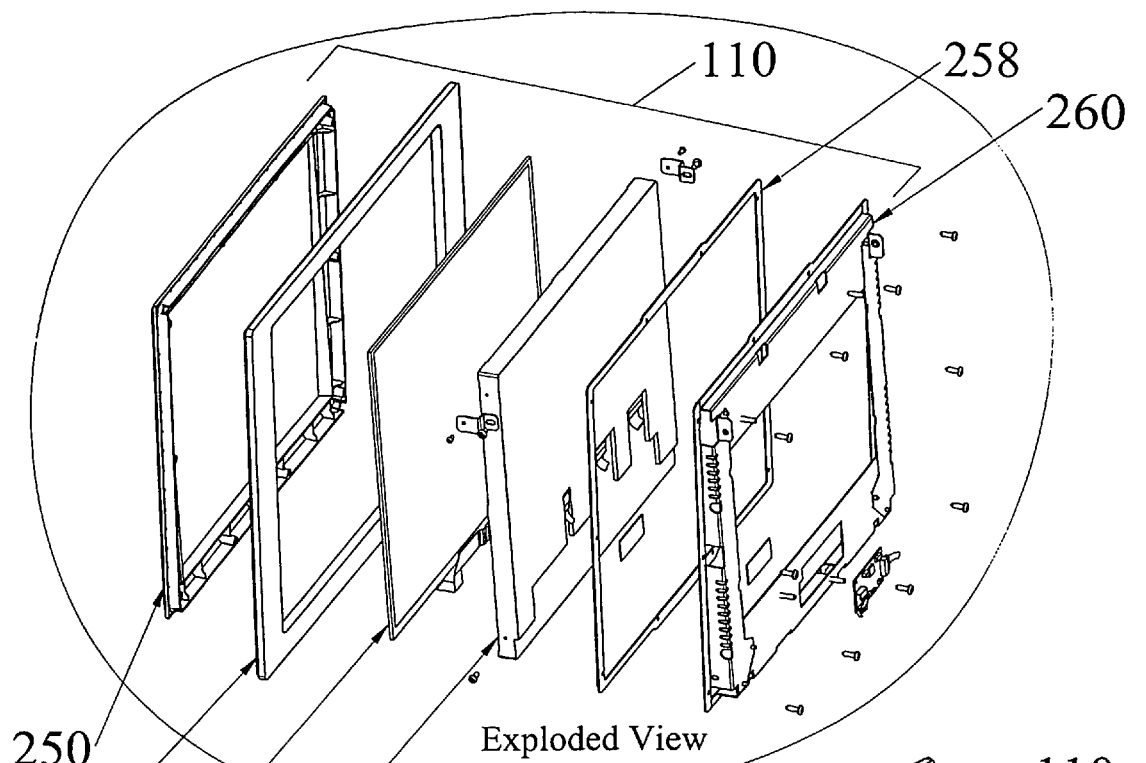
FIG. 11A is an exploded perspective view of the touch screen assembly shown in the exploded perspective view of FIG. 11B.
Figure 11B:
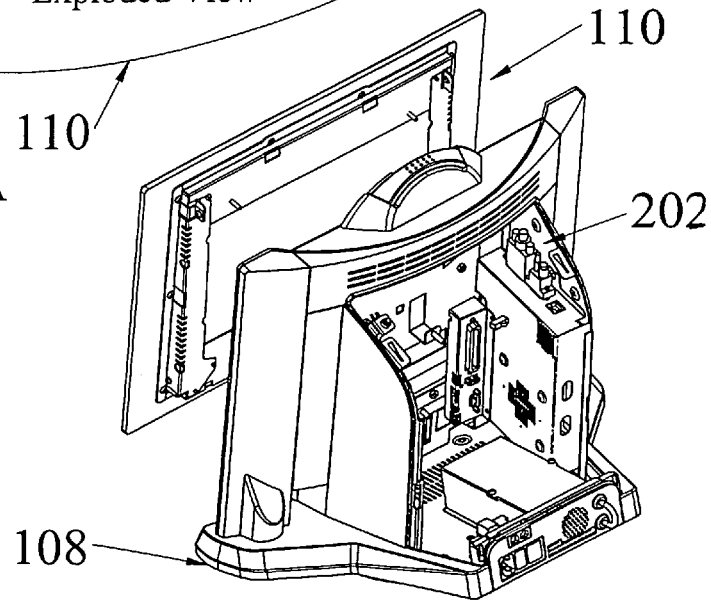
Figure 12:
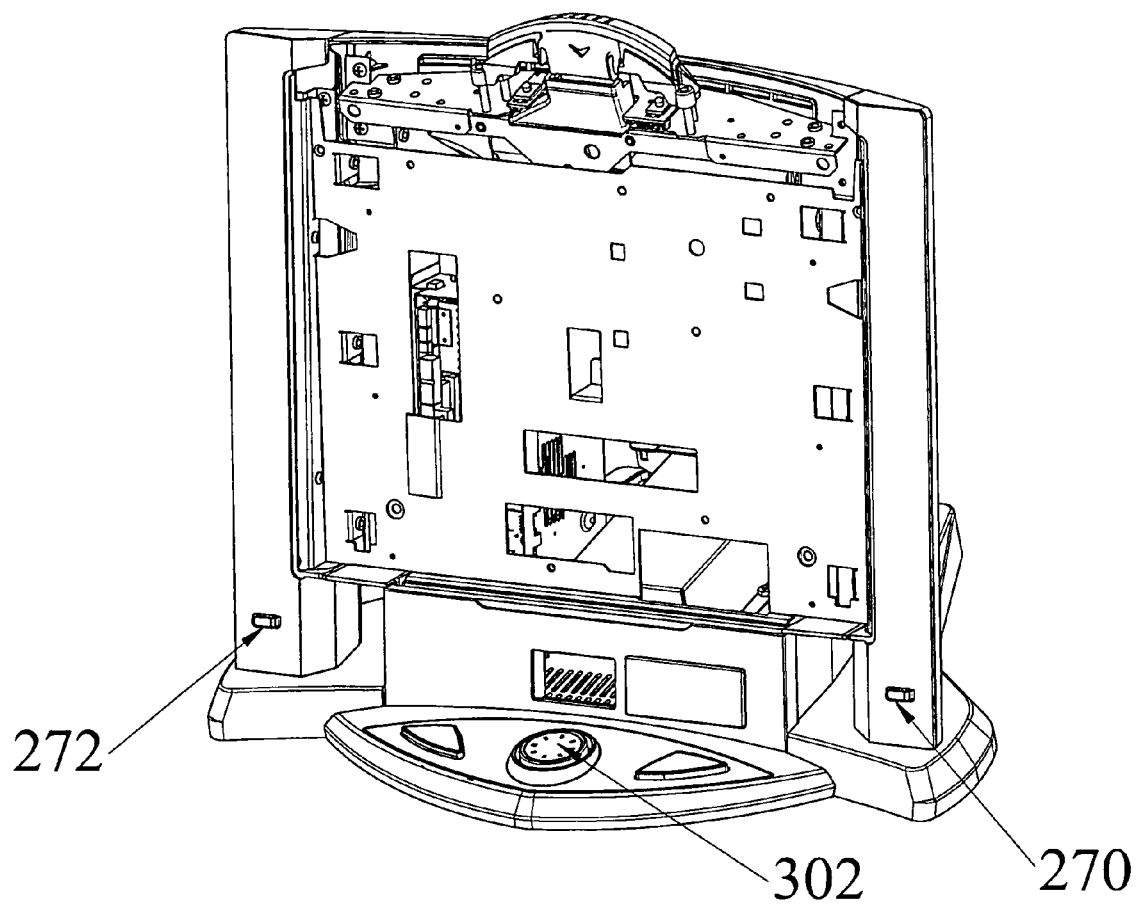
FIG. 12 is a front perspective view of the video game terminal with the touch screen assembly removed.

Details of the screen assembly are shown in FIGS. 11A and 11B. Various cover members have been provided on the structural frame and the screen assembly 108 is about to be attached to the frame. The exploded view of FIG. 11A illustrates the components of the screen assembly 108 including an outer frame bracket 250, a front panel decorative frame 252 of a translucent material, a touch screen 254, a 17 inch LCD display 256 and various brackets for holding the components together. The screen assembly includes a monitor gasket 258 that serves to secure the LCD monitor in the back cover 260. A series of bolt members pass through the back cover 260 and engage the front frame 250 to maintain the screen assembly in the conditions shown in FIG. 11B. This assembly is then attached to the frame of the game terminal at a raised position relative to the base portion 108 as shown in FIG. 12. With this arrangement, both column supports and the center pedestal serve to secure the oversized LCD screen in a protected manner.

The translucent frame overlies the columns and light sources 270 and 272 are provided below the translucent frame and introduce light into an exterior edge of the frame and cause the light to propagate upwardly through the frame member. The translucent outer frame is also preferably etched on the rear surface to provide for some transmission of the light through the front face of the frame. The etching on the back face provides some interruption in the propagated light as it is transmitted in the length of the translucent outer frame. In addition, this frame can be made of a modified translucent material that causes some of the light traveling within the frame to pass outwardly through the front face of the frame. For example, a translucent material with a milky coloration causes some of the light to pass outwardly through the face of the frame. This arrangement provides an excellent decorative effect. In order to introduce light into the edge of the frame, the bottom edge of the frame is polished and a LED light source (270, 272) is provided immediately below this polished edge. Light effectively uses the translucent member as a transmission path with partial reflection of the light through the front face of the frame. This has been found to provide a very desirable lighting of the touch screen either side thereof in a cost effective manner.

Proper selection of the translucent member and etching thereof on the rear surface as well as the particular composition of the frame allows for fine tuning of the light that will be reflected to pass out the face of the frame to provide the desired decorative lighting. This decorative lighting is preferably produced using a light emitting diode that produces blue light, although other light sources can be used. For example, it is possible to use an LED that is capable of emitting any combination of three or more colors and the operator can program the LED to emit the desired color. In this way, the operator using an operator input screen displayed on the touch screen can vary the particular lighting and the color thereof. There are also provisions for programming the changing of the emitted light as a color and/or intensity further feature to allow the operator to customize the terminal for the particular environment and enhance the player attraction mode. This light arrangement that is capable of producing red, blue and green light can be used in combination for producing other colors. This arrangement has been found to provide a cost effective means for introducing ambient lighting at the edges of the screen by providing light produced exterior to the frame to pass along an edge of the frame. This is in contrast to interior lighting at the edge of a frame or the mere provision of pot lighting behind a frame. The advantage of the present system is the transmission of light through the length of the frame by the proper introduction of the light and then the etching and/or controlled reflection of light through the front face of the frame. It is also possible to use white light or other colored light sources. It is preferred to use colored light to vary the color appearance of the translucent frame.

As clearly shown in the drawings, the center pedestal includes generally parallel side members 200 and 202 which are spaced at a distance from one another less than the width of the touch screen. This provides a generally slender center pedestal relative to the wide touch screen with the touch screen being supported by the column members either side of the pedestal. Speakers for the game terminal are provided behind the columns and are effectively protected by the columns. The light sources are provided near the base of the columns and cooperate with the frame for transmission of light upwardly through the frame.

The center pedestal includes the removable lockable cover and provides an effective enclosure for housing of the coin box and the banknote cassette.

Figure 21:
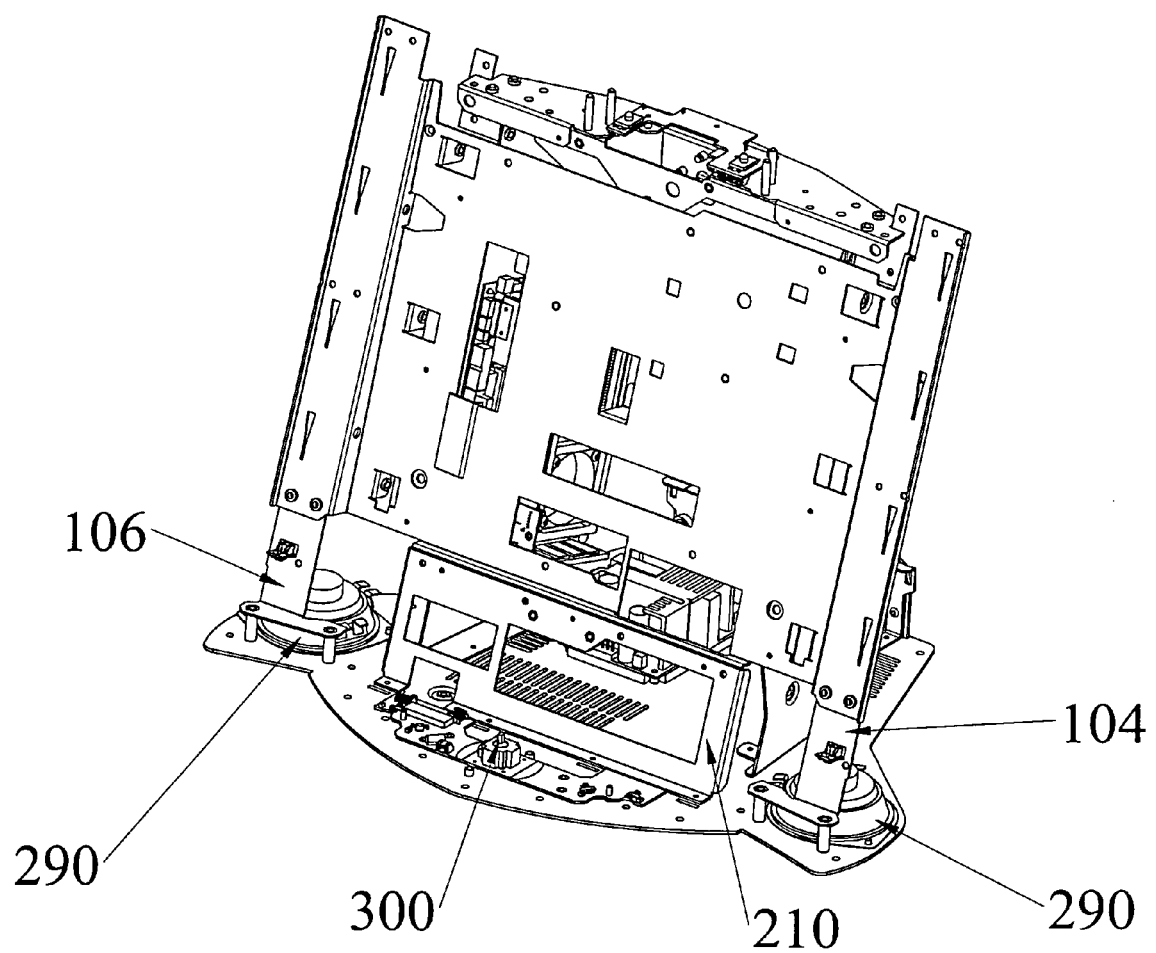
FIG. 21 is a front perspective view of the partially assembled video game terminal.
Figure 22:
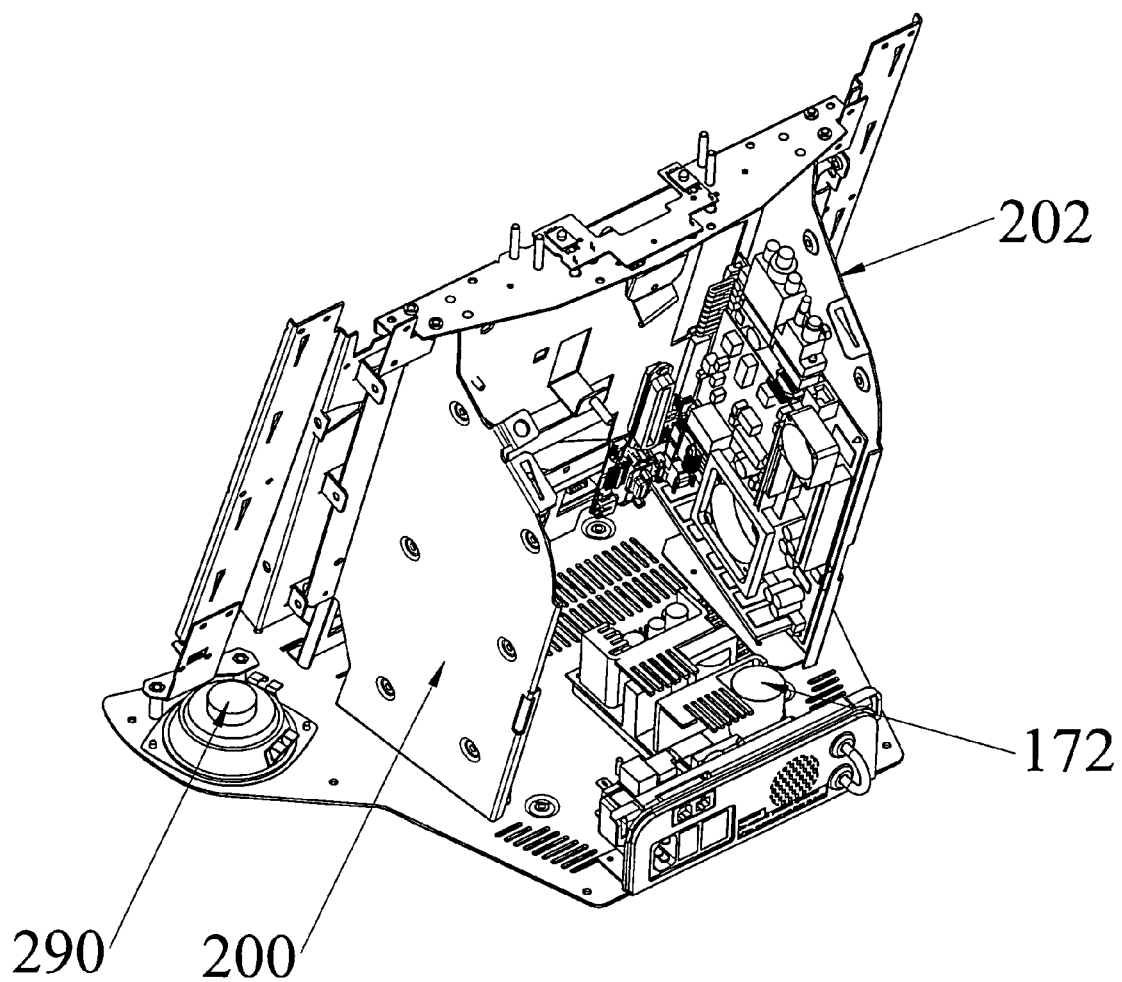
FIG. 22 is a rear perspective view showing certain details of the partially assembled video game terminal.
Figure 23:
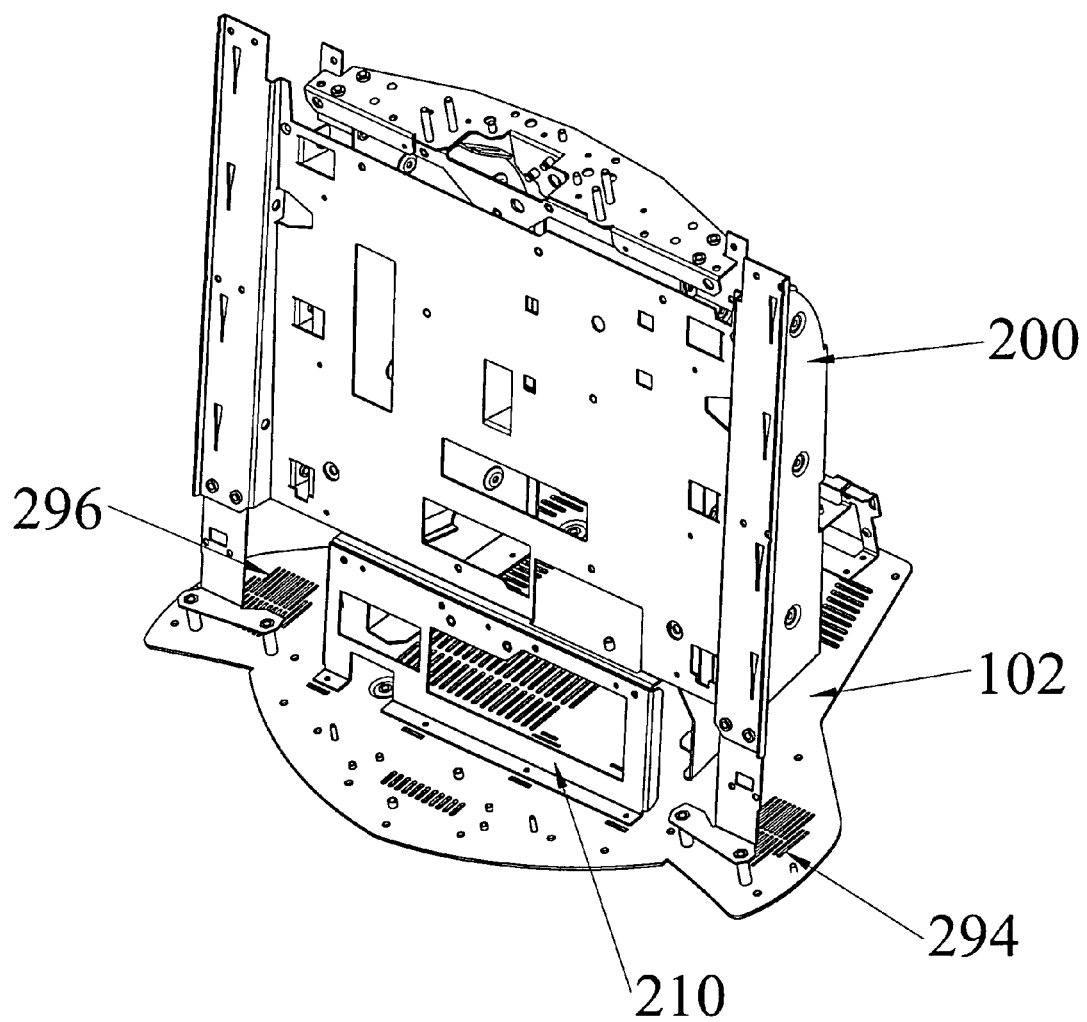
FIG. 23 shows the framework of the partially assembled video game terminal.
Figure 24:
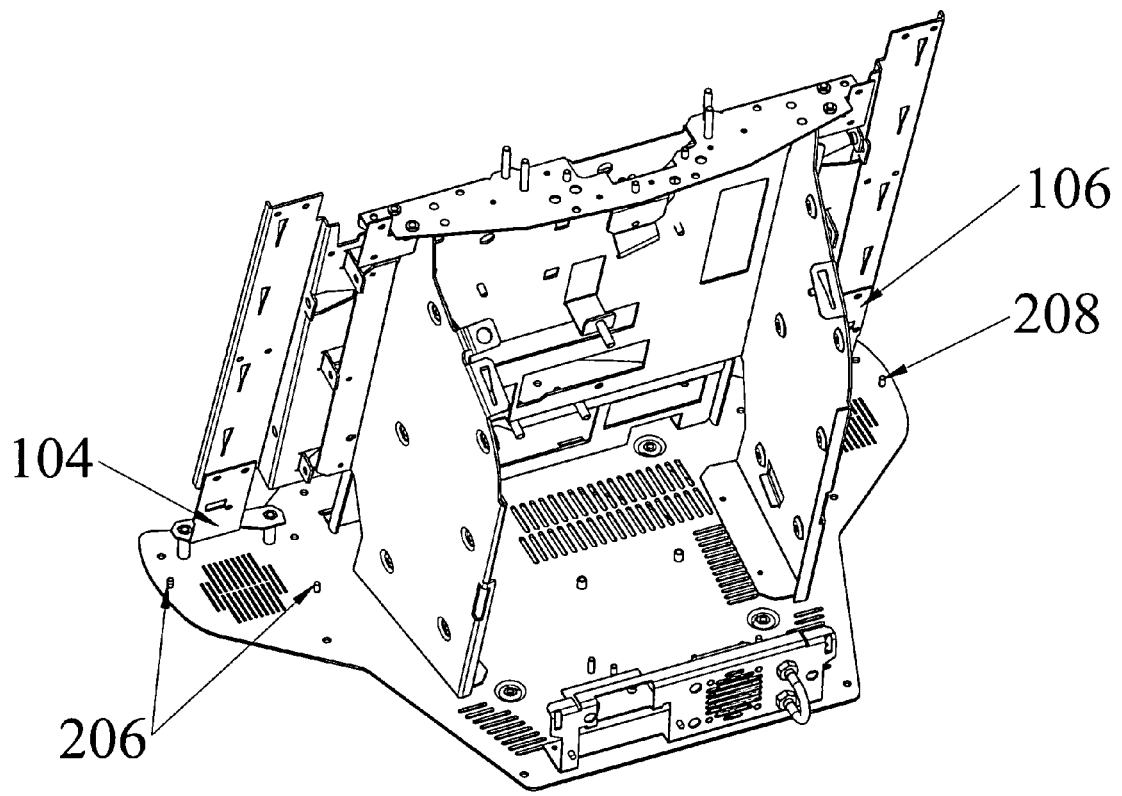
FIG. 24 is a rear perspective view of the partially assembled video game terminal.

The perspective view of FIG. 21 shows the mounting of the speakers 290 and 292 to the base member 102 and behind the column members. Further details are shown in the perspective view of FIG. 22.

Figure 13:
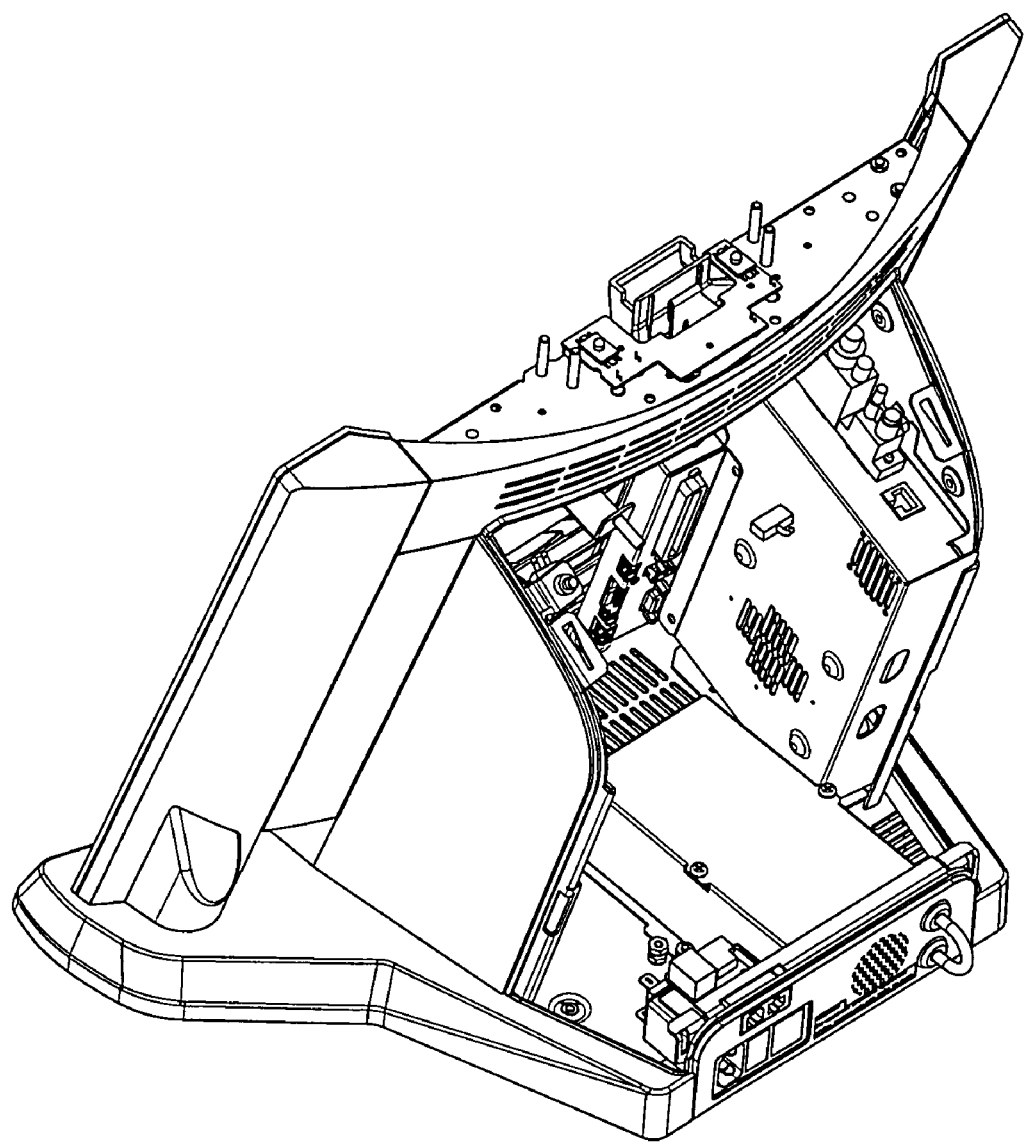
FIG. 13 is a rear perspective view of the video game terminal with the touch screen assembly removed.
Figure 14:
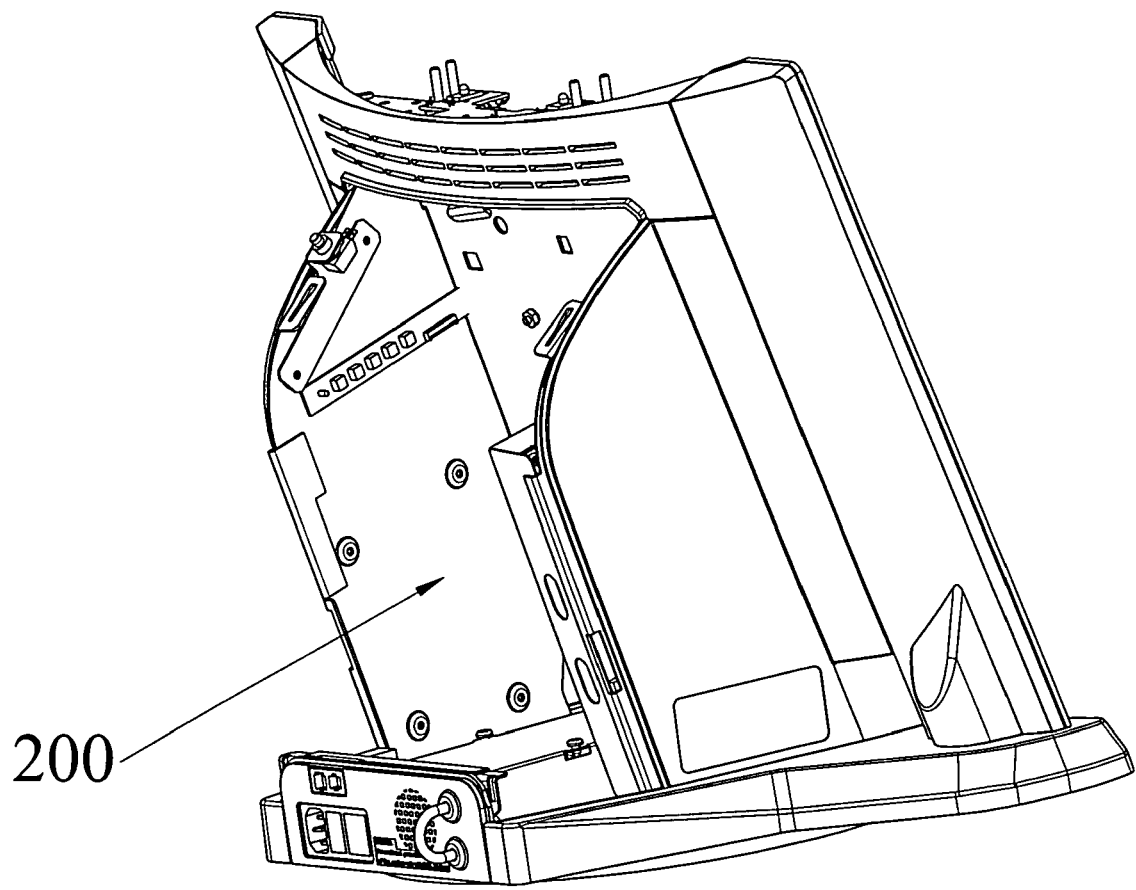
FIG. 14 is a partial rear perspective view of the video game terminal with a number of components removed to show the structural characteristics of the terminal.
Figure 15:
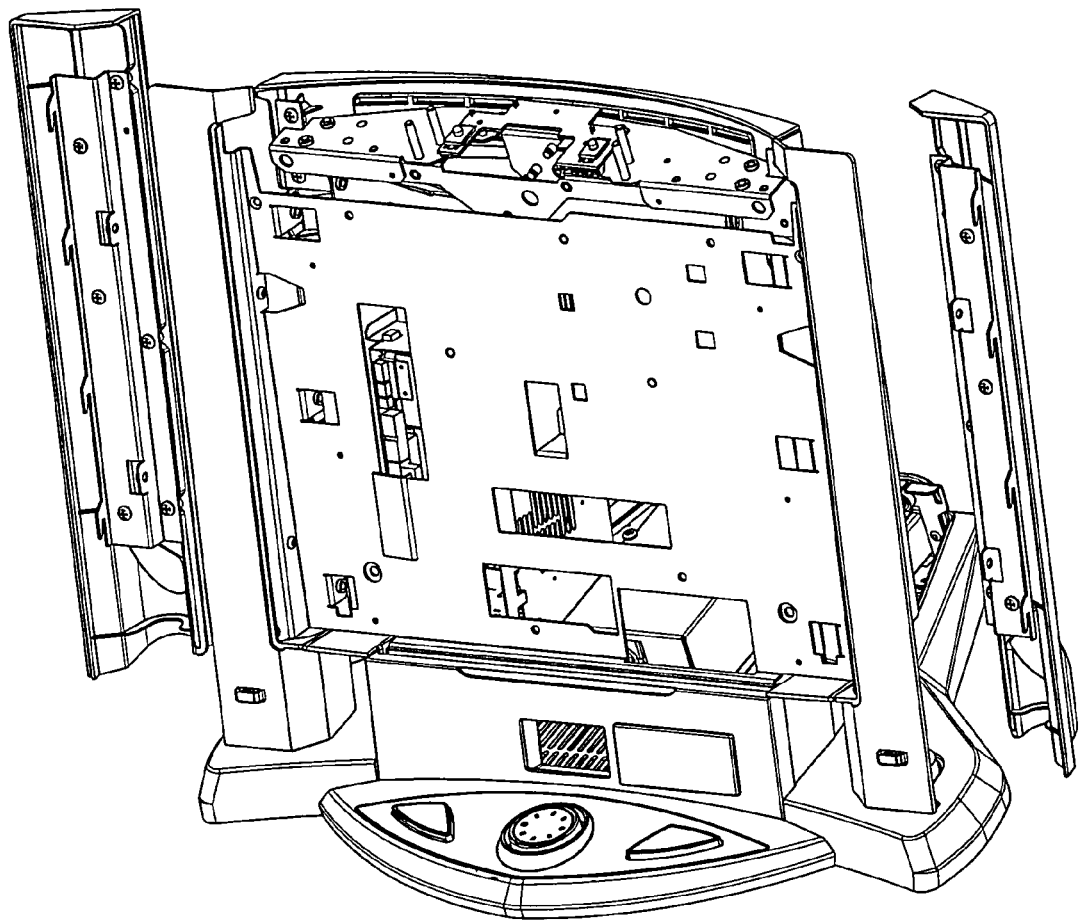
FIG. 15 is an exploded perspective view showing the countertop video game terminal and various cover portions partially removed.
Figure 16:
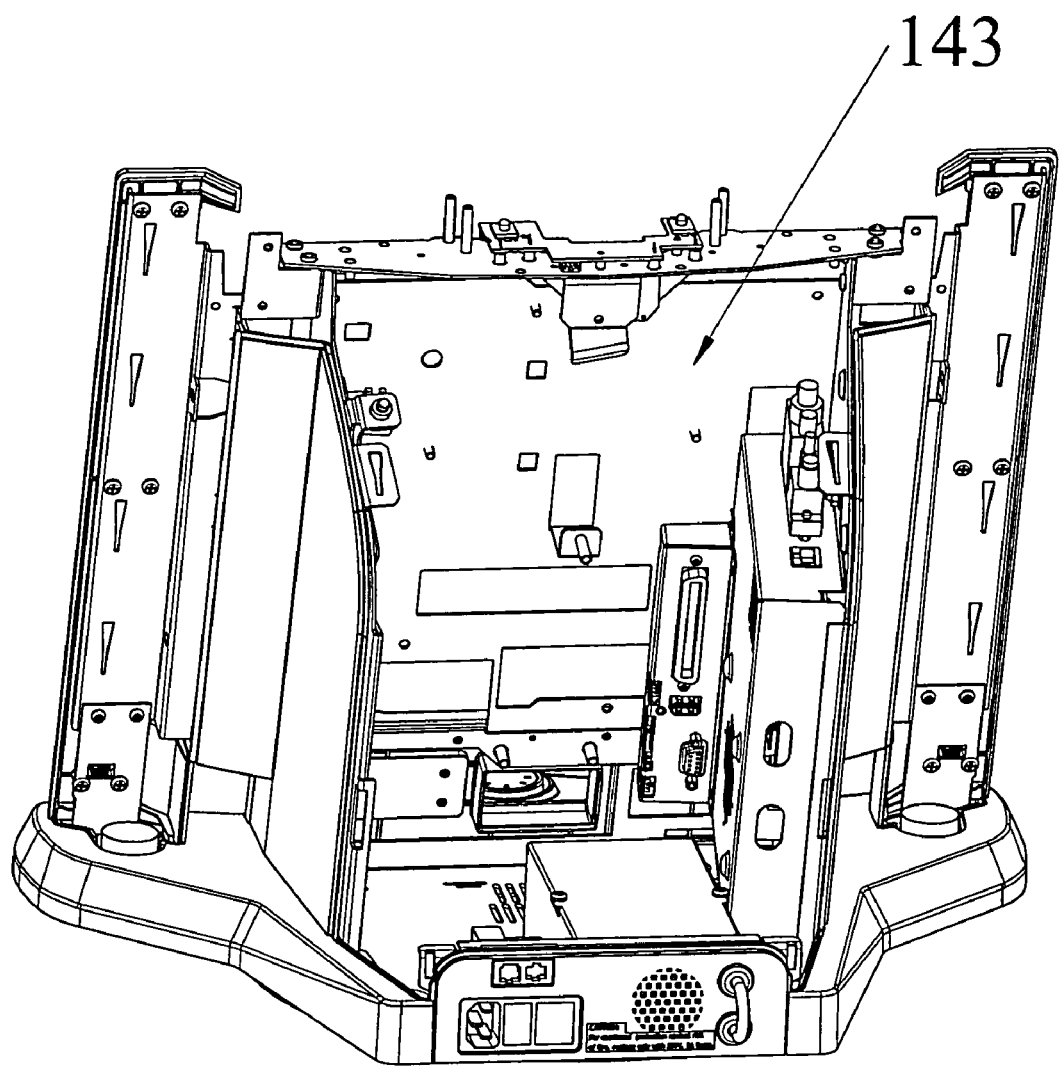
FIG. 16 is a rear perspective view of the partially assembled video game terminal.
Figure 17:
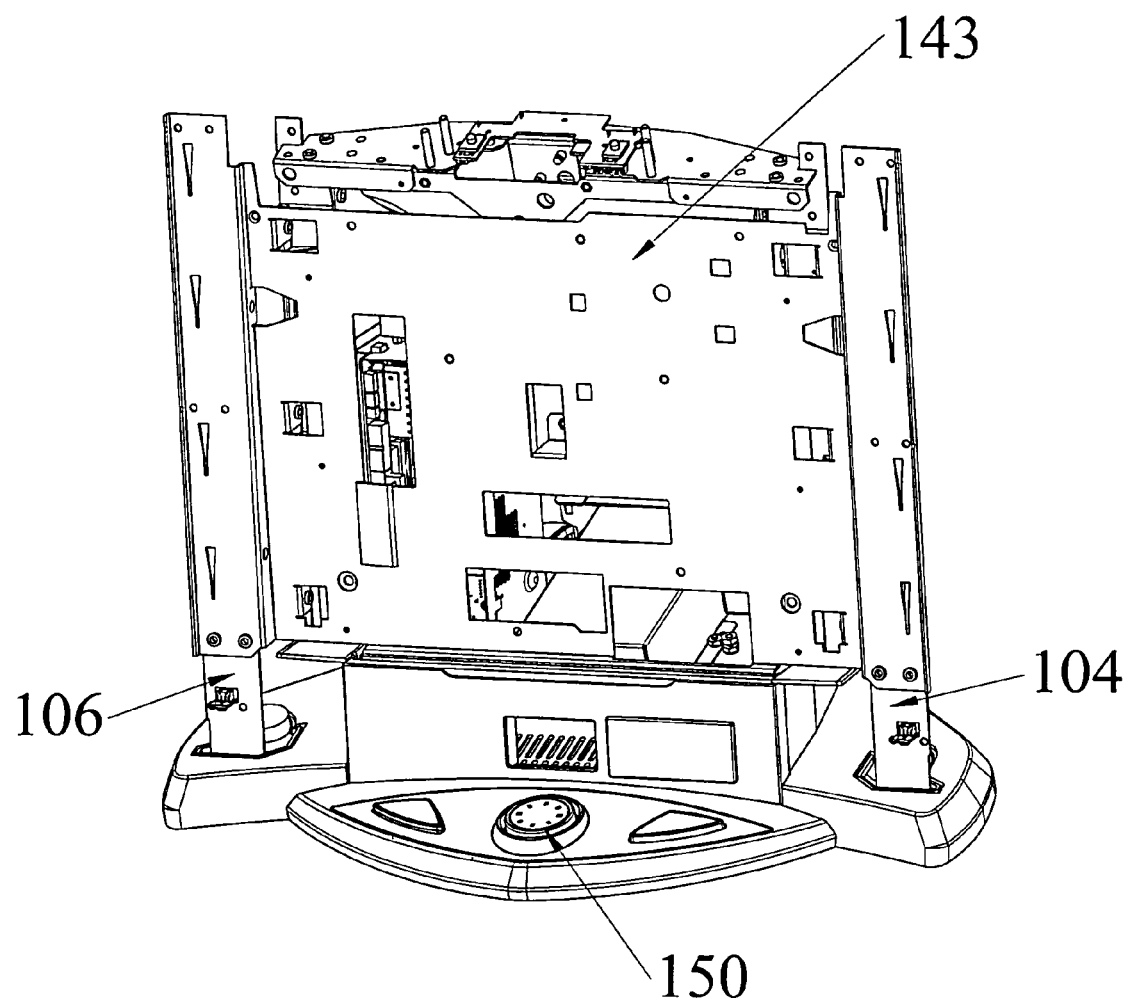
FIG. 17 is a perspective view of the partially assembled video game terminal.
Figure 18:
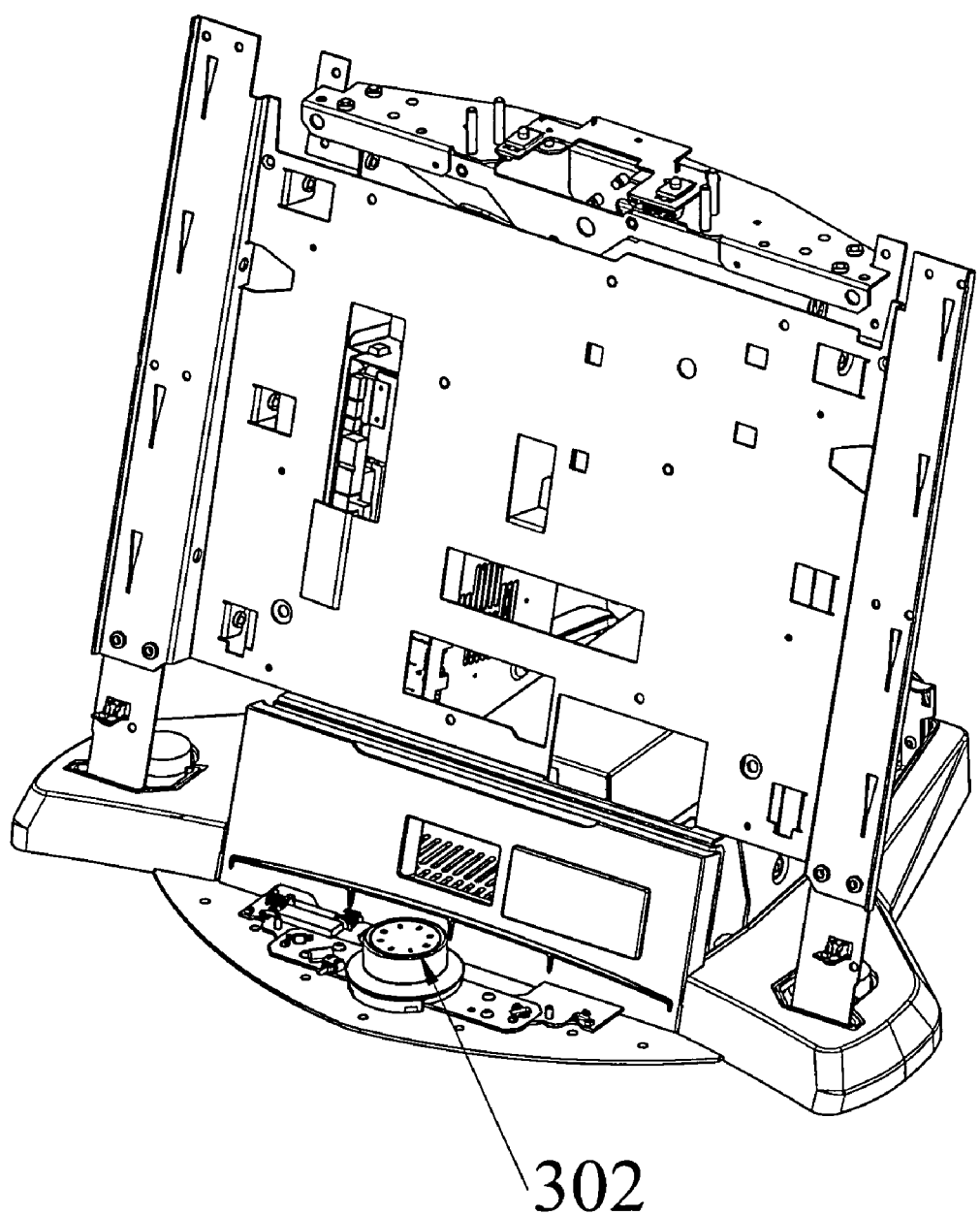
FIG. 18 is a front perspective view of the partially assembled video game terminal showing certain aspects of the controls provided at a front portion of the terminal.
Figure 19:
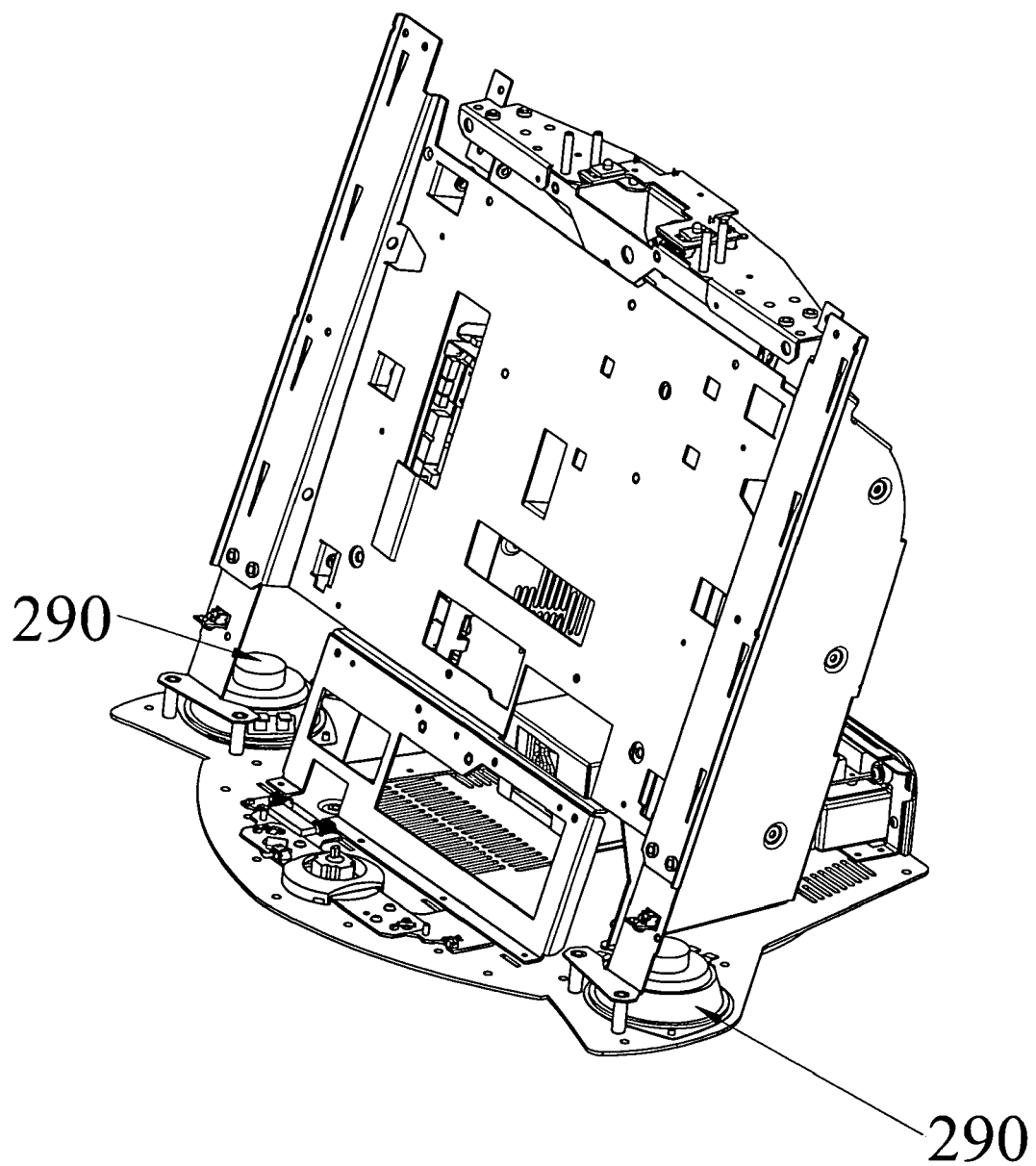
FIG. 19 is a front perspective view showing further details of the partially assembled countertop view game.
Figure 20:
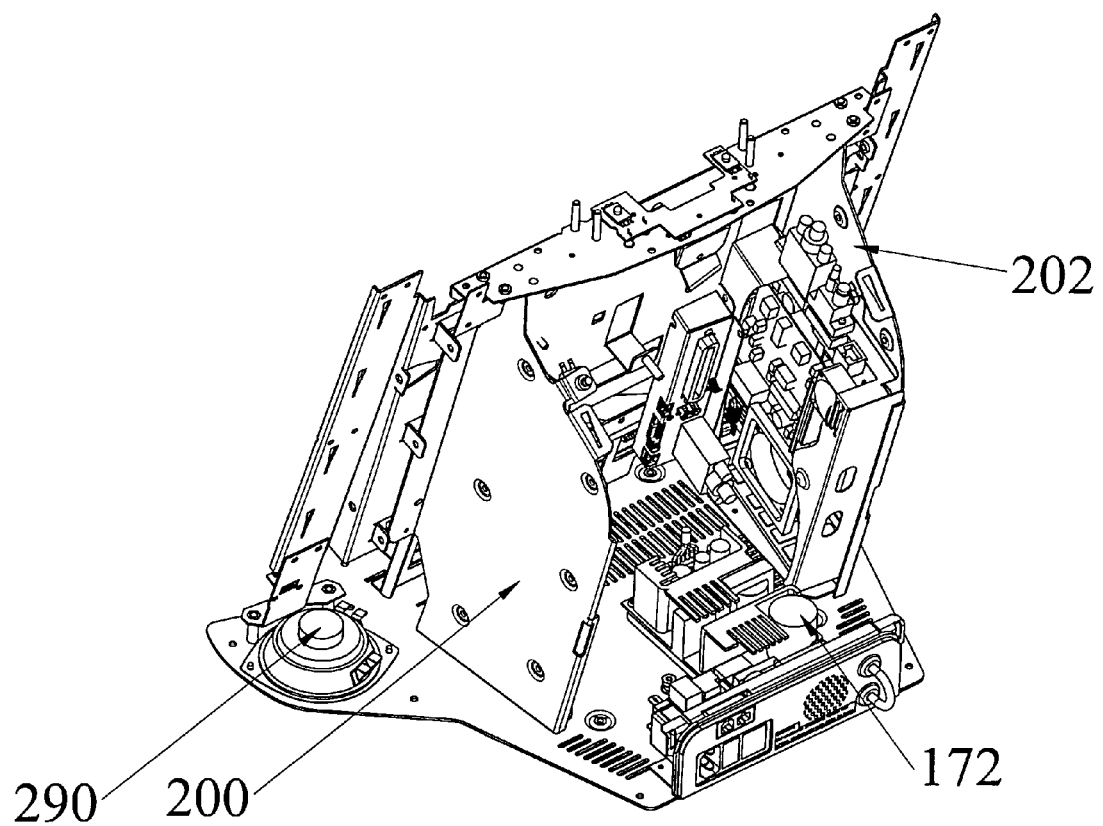
FIG. 20 is a rear perspective view of a partially assembled video game terminal.

As shown in the partially assembled countertop view of FIG. 13, these speakers are now fully covered by the rear covers of the column members and the enlarged base cover. Thus, the speakers are protected by the full coverage from above and the sound is projected through the slots 294 and 296 in the base portion and out the front. In this way, it is difficult to damage the speakers by throwing water or other liquid material on the terminal in its operative orientation. Sound is still allowed to pass out through the base 102.

The joystick controller is of a low profile and includes a top cover which does not allow pressure on the actual joy stick actuator shown as 300 in FIG. 21. A control member 302 is provided above the joystick which is supported outwardly of the joystick such that the joystick is moved by member 302 but the joystick, and in particular, the sensing components at the base of the joystick are not exposed to downward pressure or abusive force asserted by a user on the control member 302. Similarly, the control member provided above the joystick controller 300 provides protection against liquid being used to attack the joystick controller. The cover member 302 serves to direct this liquid exterior to the joystick controller.

The LED lights are also provided on the column and are effectively covered by the column members. The LED's themselves, are relatively robust and are protected on the columns. Once again, this particular arrangement is advantageous due to the abusive environment that the countertop video game terminal may be exposed to.

It has been found that the transmission of light along sections of the translucent frame provides an effective arrangement for visual enhancement of the game terminal. Low ambience light is provided but it can be colored and can be varied if desired by the operator to match a particular environment in which the game terminal is placed.

Although various preferred embodiments of the present invention have been described herein in detail, it will be appreciated by those skilled in the art, that variations may be made thereto without departing from the spirit of the invention or the scope of the appended claims.

The invention claimed is:

1. A countertop video game terminal comprising a base, a touch screen assembly mounted above the base, a center pedestal of a width less than the width of said touch screen assembly such that said touch screen assembly extends in front of and either side of said center pedestal, two column supports extending from said base and positioned to opposite sides of said center pedestal and to opposite sides of said touch screen assembly, and wherein said column supports providing edge support for said touch screen assembly.

2. A countertop video game terminal as claimed in claim 1 wherein said center pedestal includes generally parallel side members.

3. A countertop video game terminal as claimed in claim 1 wherein said column supports are spaced from said center pedestal with a gap located between said center pedestal and each column support.

4. A countertop video game terminal as claimed in claim 1 wherein each column support includes a speaker provided adjacent a base of said column support.

5. A countertop video game terminal as claimed in claim 4 wherein each speaker faces downwardly and an opening is provided in said base for transmitting sound emitted by said speakers to a front side of said countertop video game terminal.

6. A countertop video game terminal as claimed in claim 5 wherein said speakers are fully enclosed by said countertop video game terminal above.

7. A countertop video game terminal as claimed in claim 1 wherein said center pedestal includes a removable lockable cover.

8. A countertop video game terminal as claimed in claim 7 wherein said center pedestal includes interior thereto a coin acceptor and a banknote acceptor.

9. A countertop video game terminal as claimed in claim 8 wherein said center pedestal includes interior thereto a removable coin box and a removable banknote cassette.

10. A countertop video game terminal as claimed in claim 1 wherein said touch screen assembly includes an outer frame of a light transmitting translucent plastic material.

11. A countertop video game terminal as claimed in claim 10 wherein each column support includes a light source aligned with an edge of said translucent plastic material and cooperates to provide a light transmission path in the length of a member forming a side of said outer frame.

12. A countertop video game terminal as claimed in claim 10 wherein said light transmitting translucent plastic material includes a polished edge portion opposite each light source for receiving emitted light transmitted through said translucent plastic material.

13. A countertop video game terminal as claimed in claim 12 wherein each light source is an LED light source.

14. A countertop video game terminal as claimed in claim 13 wherein said LED light source is capable of emitting light of at least two different colors.

15. A countertop video game terminal as claimed in claim 14 wherein said countertop video game terminal includes programming for inputting operator instructions using said touch screen assembly for determining the color of light emitted by said LED light sources.

16. A countertop video game terminal as claimed in claim 13 wherein each LED light source is positioned below said translucent plastic frame and light is transmitted along side edges of said translucent plastic frame.

17. A countertop video game terminal as claimed in claim 16 wherein said translucent plastic frame has a composition and/or surface treatment to reflect a portion of the light passing through said translucent plastic frame out through a front face of said frame.

18. A countertop video game terminal as claimed in claim 1 wherein said base below and in front of said touch screen assembly includes a joy stick controller, said joy stick controller including a player controlled cover member movably supported in said base around said joy stick controller, said player controlled cover member moving said joy stick controller for inputting game signals while limiting abusive downward and lateral forces that can be exerted on said joy stick controller as such abusive downward and lateral forces are transmitted to said cover member and said base while maintaining the functionality of said joy stick controller for game input signals.

19. A countertop video game terminal as claimed in claim 18 wherein said cover member includes a pivoting connection between a control shaft of said joy stick controller and said cover member whereby lateral movement of said cover member is transmitted to said shaft causing lateral and pivoting movement thereof.

20. A countertop video game terminal as claimed in claim 7 wherein said removable cover of said center pedestal includes a releasable lock arrangement including two insert hooks on said cover received in slots of said pedestal for securing one edge of said cover and a 3 point key actuated mechanism for engaging an opposite edge of said removable cover to said center pedestal.

* * * * *